(12) United States Patent
Heidenfelder et al.

(10) Patent No.: US 7,196,135 B2
(45) Date of Patent: Mar. 27, 2007

(54) STABILIZING COMPOSITION I

(75) Inventors: Thomas Heidenfelder, Dannstadt (DE); Manfred Appel, Landau (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 116 days.

(21) Appl. No.: 10/497,548

(22) PCT Filed: Dec. 13, 2002

(86) PCT No.: PCT/EP02/14235

§ 371 (c)(1),
(2), (4) Date: Jun. 14, 2004

(87) PCT Pub. No.: WO03/051975

PCT Pub. Date: Jun. 26, 2003

(65) Prior Publication Data

US 2005/0090591 A1     Apr. 28, 2005

(30) Foreign Application Priority Data

Dec. 14, 2001   (DE) ................................ 101 61 861

(51) Int. Cl.
C08J 3/00       (2006.01)
C08K 5/34       (2006.01)
C08K 5/15       (2006.01)
C08K 5/53       (2006.01)
C08L 75/00      (2006.01)

(52) U.S. Cl. ...................... 524/590; 252/380; 252/397; 252/399; 252/400.2; 252/400.24; 252/401; 252/404; 252/405; 252/407; 524/99; 524/102; 524/110; 524/126; 524/287; 524/290; 524/323; 524/397; 524/507; 524/284; 524/288; 524/299; 524/316

(58) Field of Classification Search ................ 524/589, 524/590, 102, 110, 126, 287, 290, 323, 397, 524/507, 284, 288, 299, 316, 99; 252/380, 252/397, 399, 400.2, 400.24, 401, 404, 405, 252/407
See application file for complete search history.

(56) References Cited

U.S. PATENT DOCUMENTS

| | | | |
|---|---|---|---|
| 5,710,228 A * | 1/1998 | Krause et al. ............... 526/262 |
| 5,760,150 A * | 6/1998 | Bachus .................. 526/238.23 |
| 5,821,292 A | 10/1998 | Aumueller et al. |
| 2003/0180377 A1* | 9/2003 | Ramirez et al. ............ 424/616 |

FOREIGN PATENT DOCUMENTS

| | | |
|---|---|---|
| DE | 42 39 437 | 5/1994 |
| DE | 199 48 117 | 4/2001 |
| DE | 101 05 143 | 8/2002 |
| EP | 791 032 | 8/1997 |
| EP | 0 905 181 | 3/1999 |
| EP | 1 090 952 | 4/2001 |

OTHER PUBLICATIONS

U.S. Appl. No. 10/496,311, filed Jun. 3, 2004, Heidenfelder, et al.
U.S. Appl. No. 10/497,548, filed Jun. 14, 2004, Heidenfelder, et al.
U.S. Appl. No. 10/497,533, filed Jun. 10, 2004, Heidenfelder, et al.

* cited by examiner

*Primary Examiner*—Patrick D. Niland
(74) *Attorney, Agent, or Firm*—Oblon, Spivak, McClelland, Maier & Neustadt, P.C.

(57) ABSTRACT

A stabilizer composition is described and comprises a 3-arylacrylate, a polymeric compound with molecular weight at least 2000, bearing, on a polymeric framework, side groups having amine functions, where all of the substituents in the α-position to the amine nitrogen atom are other than hydrogen, and comprises a sterically hindered phenol. The stabilizer composition is particularly suitable for stabilizing thermoplastic polyurethane with respect to light, oxygen, and heat.

11 Claims, No Drawings

STABILIZING COMPOSITION I

The present invention relates to a stabilizer composition and also to its use for stabilizing non-living organic material with respect to exposure to light, oxygen, and heat.

The mechanical, chemical, and/or esthetic properties of non-living organic material, in particular plastics and paints, are known to be impaired by exposure to light, oxygen, and heat. This impairment is usually apparent in the form of yellowing, discoloration, cracking, or embrittlement of the material. Stabilizers or stabilizer compositions are intended to give satisfactory protection from impairment of organic material by light, oxygen, and heat.

Sterically hindered amines (Hindered Amine Light Stabilizers; HALS) are known stabilizers with respect to photolytic and thermal decomposition of plastics. Particularly suitable compounds of this type are oligomeric HALS. For example, DE-A-4239437 discloses certain maleimide-α-olefin copolymers having tetramethylpiperidinyl side groups, these being effective stabilizers.

Oligomeric HALS are solids. The incorporation and homogeneous distribution of these substances into plastic molding compositions, for example, has sometimes been found to be difficult.

EP0 791 032 discloses the use of certain 3-arylacrylates as stabilizers, including light stabilizers, for non-living organic material. The 3-arylacrylates may be used in combination with sterically hindered amines or with sterically hindered phenols.

DE 199 48 117 discloses a stabilizer composition which comprises a 3-arylacrylate, a sterically hindered amine, a chromane derivative, and an organic phosphite and/or phosphonite.

Factors which are often found to be unsatisfactory with these stabilizers or stabilizer compositions are low compatibility with plastics and the low duration of protective action. Recently there has also been increased interest in phosphorus-free stabilizer compositions.

It is an object of the present invention to provide a novel, phosphorus-free stabilizer composition which is easy to incorporate into the material to be stabilized and can be distributed homogeneously, and provides a high level of protective action with maximum duration of action, in particular with respect to gloss retention, with respect to exposure to light, oxygen, and heat. The stabilizer composition is intended to be particularly effective in stabilizing polyurethanes.

We have found that this object is achieved by way of a stabilizer composition which comprises
A) at least one 3-arylacrylate of the formula I

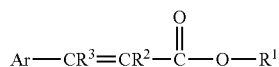

(I)

where
Ar is an aryl radical which may also bear 1, 2 or 3 substituents selected from the group consisting of $C_1$–$C_4$-alkyl, $C_1$–$C_4$-alkoxy, hydroxy, phenoxy, amino, mono- or di($C_1$–$C_4$-alkyl)amino, halogen, or nitro, or may bear a methylenedioxy group,
$R^1$ is $C_1$–$C_{20}$-alkyl, $C_2$–$C_{20}$-alkenyl, or $C_3$–$C_8$-cycloalkyl, where appropriate substituted by up to three radicals selected from the class consisting of halogen, cyano, nitro, amino, $C_1$–$C_4$-alkylamino, $C_1$–$C_4$-dialkylamino, hydroxy, $C_1$–$C_4$-alkyl, and $C_1$–$C_4$-alkoxy, and
$R^2$ and $R^3$ are hydrogen or $C_1$–$C_4$-alkyl,
B) at least one polymeric compound with molecular weight at least 2000, bearing, on a polymeric framework, side groups having amine functions, where all of the substituents in the α-position to the amine nitrogen atom are other than hydrogen,
C) at least one phenol of the formula II,

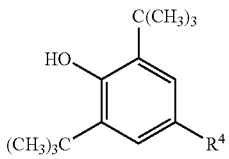

(II)

where
$R^4$ is $C_1$–$C_{20}$-alkoxycarbonyl-$C_1$–$C_6$-alkyl.

At room temperature, the stabilizer composition of the invention is generally a viscous liquid, and its incorporation into the material to be stabilized, and its homogeneous distribution therein, are therefore easy.

It has also been found that the protective action of the stabilizer composition of the invention with respect to exposure to light, oxygen, and heat is higher than would be expected from the contributions of the components of the stabilizer composition. The well-developed protective action provided by the stabilizer composition of the invention is therefore based on a synergistic effect of the components.

As component A), the stabilizer composition of the invention encompasses a 3-arylacrylate of the formula I

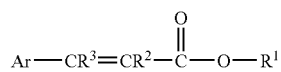

(I)

Examples of Ar in formula I are
phenyl,
o-, m- or p-tolyl,
o-, m- or p-ethylphenyl,
o-, m- or p-propylphenyl,
m- or p-cumyl,
o-, m- or p-butylphenyl,
m- or p-isobutylphenyl,
m- or p-sec-butylphenyl,
m- or p-tert-butylphenyl,
2,3-, 2,4-, 2,5-, 2,6-, 3,4- or 3,5-dimethylphenyl, mesityl,
o-, m- or p-methoxyphenyl,
o-, m- or p-ethoxyphenyl,
o-, m- or p-propoxyphenyl,
m- or p-isopropoxyphenyl,
o-, m- or p-butoxyphenyl,
m- or p-isobutoxyphenyl,
m- or p-sec-butoxyphenyl,
m- or p-tert-butoxyphenyl,
2,3-, 2,4-, 2,5-, 2,6-, 3,4- or 3,5-dimethoxyphenyl,
o-, m- or p-hydroxyphenyl,
2,3-, 2,4-, 2,5-, 2,6-, 3,4- or 3,5-dihydroxyphenyl,
3-hydroxy-4-methoxyphenyl,
m- or p-phenoxyphenyl,
o-, m- or p-aminophenyl,
o-, m- or p-(N-methylamino)phenyl, o-, m- or p-(N,N-dimethylamino)phenyl, o-, m- or p-fluorophenyl, o-, m- or p-chlorophenyl, 2,4-dichlorophenyl, o-, m- or p-bromophenyl, o-, m- or p-nitrophenyl, 2,3- or 3,4-methylenedioxyphenyl, 2-, 3- or 4-biphenyl, and α- or β-naphthyl.

Particular preference is given to $C_1$–$C_4$-alkoxyphenyl radicals, in particular those where the position of the alkoxy radical on the phenyl core is para.

$R^1$ is a straight-chain or branched $C_1$–$C_{20}$-alkyl group, e.g. methyl, ethyl, n-propyl, isopropyl, n-butyl, isobutyl, sec-butyl, tert-butyl, n-pentyl, isopentyl, sec-pentyl, tert-pentyl, neo-pentyl, n-hexyl, n-heptyl, n-octyl, 2-ethylhexyl, n-nonyl, isononyl, n-decyl, n-undecyl, n-dodecyl, n-tridecyl, isotridecyl, n-tetradecyl, n-hexadecyl, n-octadecyl, n-eicosyl; or a straight-chain or branched $C_2$–$C_{20}$-alkylene group, e.g. vinyl, allyl, methallyl, oleyl, linolyl or linolenyl; or a $C_3$–$C_8$-cycloalkyl group, such as cyclopropyl, cyclobutyl, cyclopentyl, cyclohexyl, cycloheptyl or cyclooctyl. Among these, preference is given to straight-chain or branched $C_5$–$C_{16}$-alkyl groups, in particular straight-chain or branched $C_8$–$C_{12}$-alkyl groups. Of particular interest are straight-chain or branched $C_8$-alkyl groups. Among the cycloalkyl groups, preference is given to cyclopentyl and cyclohexyl.

The groups mentioned may have substitution by up to three radicals selected from the group consisting of halogen, cyano, nitro, amino, $C_1$–$C_4$-alkylamino, $C_1$–$C_4$-dialkylamino, hydroxy, $C_1$–$C_4$-alkyl, and $C_1$–$C_4$-alkoxy.

The radicals $R^2$ and $R^3$, independently of one another, are in particular hydrogen, methyl, or ethyl. It is very particularly preferable that in the formula I $R^2$ is hydrogen or methyl and $R^3$ is hydrogen.

2-Ethylhexyl p-methoxycinnamate is particularly preferred as 3-arylacrylate of the formula I.

As component B), the stabilizer composition of the invention comprises a polymeric compound with molecular weight at least 2 000, in particular from 2 300 to 50 000, which, on a polymeric framework, bears side groups having amine functions, where all of the substituents in the α-position to the amine nitrogen atom are other than hydrogen and are $C_1$–$C_4$-alkyl radicals for example, in particular methyl groups. The compound suitable as component B) is therefore one composed of successive repeat units, each repeat unit having a polymer framework fraction and at least one side group having at least one amine function, where all of the substituents in the α-position to the amine nitrogen atom are other than hydrogen. The repeat unit may have other side groups, for example those which improve compatibility with the organic material to be stabilized. Component B) generally encompasses from 5 to 100 repeat units, preferably from 6 to 60 repeat units.

Components B) are advantageously maleic anhydride (co)polymers, e.g. those composed of from 0 to 90 mol % of $C_2$–$C_{30}$ α-olefin units and from 10 to 100 mol % of maleic anhydride units, where some or all of the maleic anhydride units, e.g. more than 92 mol %, have been imitated using 4-amino-2,2,6,6-tetramethylpiperidine, or using 4-amino-1,2,2,6,6-pentamethylpiperidine.

Component B) is particularly preferably a maleic acid-α-olefin copolymer composed of structural units of the formula III

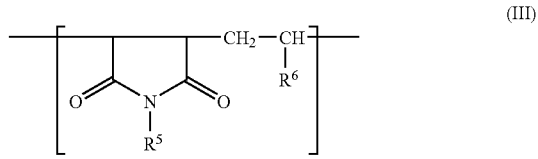

where at least 92 mol % of the radicals $R^5$ are a tetramethylpiperidinyl radical of the formula IV

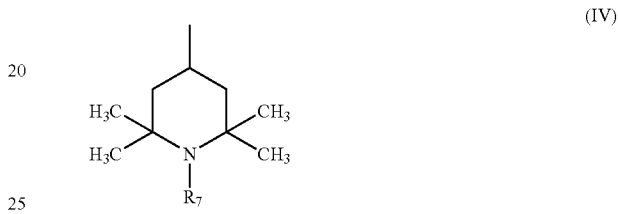

and up to 8 mol % of the radicals $R^5$ are hydrogen, $C_1$–$C_{22}$-alkyl or $C_5$–$C_8$-cycloalkyl, $R^6$ is $C_{14}$–$C_{28}$-alkyl, preferably $C_{16}$–$C_{24}$-alkyl, in particular $C_{18}$–$C_{22}$-alkyl, and $R^7$ is hydrogen or $C_1$–$C_6$-alkyl, preferably hydrogen, methyl, or ethyl, in particular hydrogen or methyl.

The radical $R^6$ is preferably a mixture of $C_{14}$–$C_{28}$-alkyl groups, preferably $C_{16}$–$C_{24}$-alkyl groups, in particular $C_{18}$–$C_{22}$-alkyl groups. The plot of the molar proportion of the alkyl groups of a given carbon number, based on the total number of all of the radicals $R^6$ in the copolymer molecules of a specimen, against the carbon number preferably comprises at least two maxima, each of which represents at least 30 mol %, preferably at least 40 mol %, and the carbon numbers associated with which differ by one or preferably two carbon atoms. Particular mixtures are those of octadecyl, eicosyl, and docosyl, where two of these groups, which differ by two carbon atoms, make up more than 40 mol % of the mixture of the radicals R, and the third group makes up from 3 to 19 mol % of the mixture of the radicals R.

The copolymers of the formula III may be prepared by a process which reacts alternating maleic anhydride-α-olefin copolymers with 4-amino-2,2,6,6-tetramethylpiperidines of the formula V,

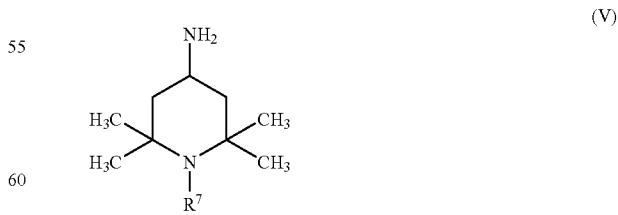

where $R^7$ is as defined above and, if desired, up to 8 mol %, based on the copolymer, of ammonia, $C_1$–$C_{22}$-alkylamino or $C_5$–$C_8$-cycloalkylamine, in an organic solvent at from 100 to 220° C. Particularly suitable organic solvents are aromatic hydrocarbons, such as toluene, xylene, or mesitylene, and halogenated or nitrated hydrocarbons, such as chlorobenzene, dichlorobenzenes, and nitrobenzenes. The water formed during the reaction may advantageously be removed by azeotropic distillation. The maleic anhydride-α-olefin copolymers used as starting material are obtainable via copolymerization of maleic anhydride with α-olefins or with α-olefin mixtures, for example by a method based on Houben-Weyl, Methoden der Organischen Chemie, volume E20/2, pp. 1237–1248 (1987). The entire content of DE-A-4239437 is incorporated herein by way of reference in relation to preferred compounds suitable as component B).

As component C), the stabilizer composition of the invention comprises at least one phenol of the formula II

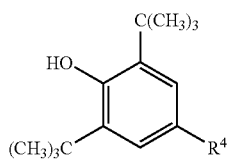

(II)

where
$R^4$ is $C_1$–$C_{20}$-alkoxycarbonyl-$C_1$–$C_6$-alkyl, preferably $C_1$–$C_{20}$-alkoxycarbonyl-$C_1$–$C_4$-alkyl.

Particularly suitable compounds for this purpose are (3,5-di-tert-butyl-4-hydroxyphenyl)propionates of $C_1$–$C_{20}$-alkanols, for example isooctyl 3-(3,5-di-tert-butyl-4-hydroxyphenyl)propionate, commercially available with the name Irganox® 1135 from the company Ciba-Geigy, n-octadecyl 3-(3,5-di-tert-butyl-4-hydroxyphenyl)-propionate, commercially available with the name Irganox® 1076 from the company Ciba-Geigy.

The stabilizer composition of the invention also optionally comprises at least one other light stabilizer which absorbs radiated light in the UV-A (320–400 nm) and/or UV-B (280–320 nm) region. Of course, the additional light stabilizers have to be compatible with the stabilizer composition, and preferably colorless in the visible region. Examples which may be mentioned of UV absorbers of this type are: 2-hydroxybenzophenones, 2-hydroxyphenylbenzotriazoles, oxanilides, 2-hydroxyphenyltriazines, 4,4'-diarylbutadienes.

Examples of suitable 2-hydroxybenzophenones, of which a wide variety is commercially available, are: 2-hydroxy-4-dodecoxybenzophenone, 2-hydroxy-4-methoxybenzophenone, 2,4-dihydroxybenzophenone, 2,2'-dihydroxy-4-methoxybenzophenone (trade name Cyasorb® UV 24, American Cyanamid), 2,2'-dihydroxy-4,4'-di-methoxybenzophenone, 2,2',4,4'-tetrahydroxybenzophenone. The 2-hydroxybenzophenones feature good UV resistance and high absorptive power.

Examples of suitable 2-hydroxyphenylbenzotriazoles are 2-(2'-hydroxy-5'-methylphenyl)benzotriazole (trade name Tinuvin® P, Ciba-Geigy), 2-(2'-hydroxy-5'-tert-octylphenyl)-benzotriazole (trade name Cyasorb® UV 5411), 2-(2'-hydroxy-3'-tert-butyl-5'-methylphenyl)benzotriazole (trade name Tinuvin® 326, Ciba-Geigy), 2-(2'-hydroxy-3',5'-di-tert-butylphenyl)-5-chlorobenzotriazole (trade name Tinuvin® 327, Ciba-Geigy). 2-Hydroxyphenylbenzotriazoles absorb at the limit of the visible region and do not exhibit any yellow coloration.

An example of a suitable 2-hydroxyphenyltriazine is 2,4-bis-(2',2",4',4"-tetramethylphenyl)-6-(2'''-hydroxy-4'''-octoxy-phenyl)-1,3,5-triazine (trade name Cyasorb® 1164, American Cyanamid).

Examples of preferred oxanilides are:

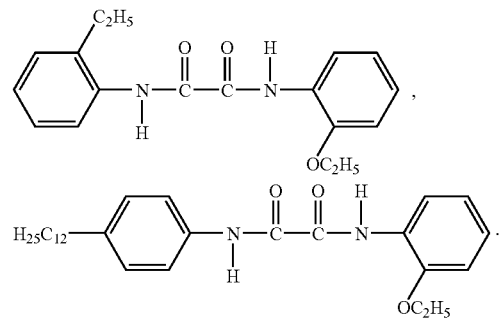

4,4'-Diarylbutadienes of the formula VI

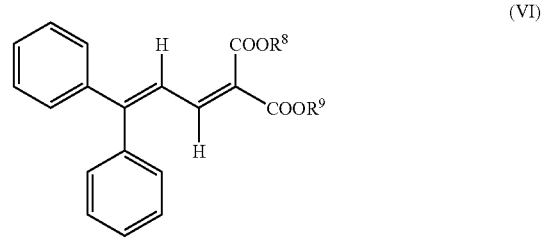

(VI)

are known from EPA 916 335. The substituents $R^8$ and/or $R^9$ are preferably $C_1$–$C_8$-alkyl and $C_5$–$C_8$-cycloalkyl.

The stabilizer composition of the invention generally comprises
from 35 to 45 parts by weight, preferably from 37 to 43 parts by weight, of A),
from 35 to 45 parts by weight, preferably from 37 to 43 parts by weight, of B), and
from 15 to 25 parts by weight, preferably from 17 to 25 parts by weight, of C).

If concomitant use is made of another light stabilizer, its amount used is preferably from 0.1 to 15 parts by weight, preferably from 1 to 12 parts by weight.

The concentration of the stabilizer composition of the invention added to the organic material to be stabilized, prior to, during, or after its preparation, is generally from 0.01 to 5% by weight, preferably from 0.01 to 2% by weight, in particular from 0.05 to 1% by weight, based on the organic material.

Examples of non-living organic material are cosmetic preparations, such as ointments and lotions, pharmaceutical formulations, such as pills and suppositories, photographic recording materials, in particular photographic emulsions, precursors of plastics and paints, and in particular the actual paints and plastics themselves.

Examples which may be mentioned of plastics which can be stabilized by the stabilizer mixture of the invention are:
polymers of mono- or diolefins, e.g. low- or high-density polyethylene, and polypropylene, linear poly-1-butene, polyisoprene, polybutadiene, and also copolymers of mono- or diolefins, and mixtures of the polymers mentioned;

polystyrene, and also copolymers of styrene or α-methylstyrene with dienes and/or with acrylic derivatives, e.g. styrene-butadiene, styrene-acrylonitrile (SAN), styrene-ethyl methacrylate, styrene-butadiene-ethyl acrylate, styrene-acrylonitrile-methacrylate, acrylonitrile-butadiene-styrene (ABS), and methyl methacrylate-butadiene-styrene (MBS);

halogen-containing polymers, e.g. polyvinyl chloride, polyvinyl fluoride, polyvinylidene fluoride and also copolymers of these;

polymers which derive from α,β-unsaturated acids or from derivatives of these, for example polyacrylates, polymethacrylates, polyacrylamides, and polyacrylonitriles;

polymers which derive from unsaturated alcohols and amines or from their acid derivatives or acetals, e.g. polyvinyl alcohol and polyvinyl acetate;

polyurethanes, polyamides, polyureas, polyphenylene ethers, polyesters, polycarbonates, polysulfones, polyether sulfones, and polyether ketones.

The paints which may be stabilized using the stabilizer composition of the invention include paints such as alkyd resin paints, emulsion paints, epoxy resin paints, polyurethane paints, acrylic resin paints, cellulose nitrate paints, and varnishes, such as wood-protection varnishes.

The stabilizer composition of the invention is particularly suitable for stabilizing polyurethanes, in particular thermoplastic polyurethanes. These are mainly linear polyurethanes which are obtained from diisocyanates, such as 4,4'-diisocyanatodiphenylmethane, and from long-chain diols, such as polytetrahydrofuran or polyester polyols. The starting material used is generally appropriate prepolymers, and short-chain diols or diamines are used as chain extenders. The resultant products have a segmented structure, examples of molecular weights of the soft segments being from 1 000 to 3 000, these being crosslinked physically by the hard segments.

The stabilizer composition of the invention may also be prepared in the form of a masterbatch, for example one which comprises a concentration of from 2.5 to 25% by weight of the composition, the masterbatch being added to the materials to be stabilized.

The materials stabilized using the stabilizer composition of the invention exhibit particular quality features with regard to color change and gloss retention when compared with materials stabilized with the comparative composition, i.e. their impairment by external effects is delayed. There should be a maximum of retention of gloss and color during entire service life, and loss of these always means loss of quality. The materials stabilized according to the invention therefore feature a prolonged service time.

The examples below give further illustration of the invention.

I. Description of Test Methods

1. Determination of Gardner Gloss Level

Gloss is measured using a Gardner Micro-Gloss 600 reflectometer to DIN 67530.

2. Determination of Color Difference

Prior to and after weathering, the CIELAB color differences $\Delta E$ were calculated for each specimen from the tristimulus values with the aid of the color difference formula. The CIE tristimulus values X, Y, and Z were determined for the specimens using the DataColor color-measurement device from Datacolor.

II. EXAMPLES

Example 1

A mixture was prepared from 40 parts by weight of 2-ethylhexyl p-methoxycinnamate, 40 parts by weight of an alternating N-(2,2,6,6-tetramethyl-4-piperidinyl)maleimide-$C_{20}$–$C_{24}$-α-olefin copolymer and 20 parts by weight of isooctyl 3-(3,5-di-tert-butyl-4-hydroxyphenyl)propionate.

The comparison used was a commercially available stabilizer composition.

Comparative Example 60 parts by weight of 2-ethylhexyl p-methoxycinnamate, 20 parts by weight of bis(1,2,2,6,6-pentamethyl-piperidin-4-yl) sebacate, and 20 parts by weight of a mixture made from 1 part by weight of α-tocopherol and 10 parts by weight of tris(nonylphenyl) phosphite.

III. Testing of Stabilizer Action

The stabilizer was added to a TPU reaction, and the samples here were produced by casting.

1% by weight of the stabilizer composition of example 1 or of the comparative example was incorporated into a specimen. Since rapid yellowing occurred under the test conditions in the case of the unstabilized specimen, it was not possible to use the unstabilized specimen to carry out a control test.

Test specimens were weathered using a Weather-Ometer® accelerated weathering device from the company Atlas Materials Testing Technology B.V., the Netherlands. Gardner gloss (table 1) and color difference (table 2) were determined as a function of weathering time. The results are given in tables 1 and 2 below.

TABLE 1

| Gardner gloss as a function of time | | | | | |
|---|---|---|---|---|---|
| | 0 [h] | 500 [h] | 1000 [h] | 1500 [h] | 2000 [h] |
| Comparison | 27 | 38 | 40 | 30 | 2 |
| Example 1 | 28 | 30 | 39 | 45 | 30 |

As can be seen from table 1, the specimens stabilized using the stabilizer composition of the invention exhibited markedly better retention of gloss than the specimen stabilized using the comparative composition after weathering for 1 500 and, respectively, 2 000 hours.

TABLE 2

| Color difference $\Delta E$ - CIE as a function of time | | | | | |
|---|---|---|---|---|---|
| | 200 [h] | 400 [h] | 600 [h] | 800 [h] | 1000 [h] |
| Comparison | 4.3 | 5.4 | 3.9 | 1.1 | 4.6 |
| Example 1 | 2.7 | 1.7 | 1.0 | 1.6 | 3.8 |

We claim:

1. A phosphorus-free stabilizer composition comprising
A) at least one 3-arylacrylate of the formula I

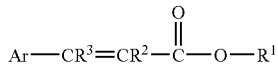

where
Ar is phenyl radical which contains at least one substitutent selected from $C_1$–$C_4$-alkoxy,
$R^1$ is $C_5$–$C_{16}$-alkyl,
$R^2$ is hydrogen or methyl; and
$R^3$ is hydrogen,
B) at least one acid-α-olefin copolymer composed of structural units of the formula III,

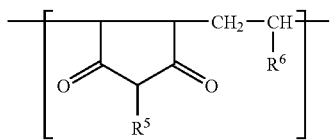

where
$R^5$ is a tetramethylpiperidinyl radical of the formula IV,

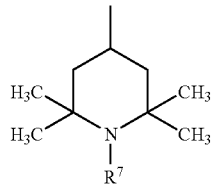

$R^6$ is $C_{14}$–$C_{28}$-alkyl,
$R^7$ is hydrogen or $C_1$–$C_6$-alkyl, and
n ranges from 5 to 100;

C) at least one phenol of the formula II

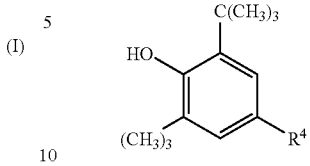

where
$R^4$ is $C_1$–$C_{20}$-alkoxycarbonyl-$C_1$–$C_4$-alkyl.

2. A stabilizer composition as claimed in claim 1, wherein said 3-arylacrylate is 2-ethylhexyl p-methoxycinnamate.

3. A stabilizer composition as claimed in claim 1, wherein said polymeric compound is a maleic acid-α-olefin copolymer at least 92 mol % of the radical $R^5$ are the tetramethylpiperidinyl radical of the formula IV and up to 8 mol % of the radical $R^5$ are hydrogen,
$R^6$ is a $C_{16}$–$C_{24}$-alkyl,
$R^7$ is hydrogen, methyl, or ethyl, and
n ranges from 6 to 60.

4. A stabilizer composition as claimed in claim 3, where $R^7$ is hydrogen or methyl.

5. A stabilizer composition as claimed in claim 1, wherein said phenol of the formula II is isooctyl 3-(3,5-di-tert-butyl-4-hydroxyphenyl)propionate.

6. A stabilizer composition as claimed in claim 1 further comprising at least one other light stabilizer.

7. A method for stabilizing non-living organic material with respect to exposure to light, oxygen, and heat comprising using said stabilizer composition as claimed in claim 1.

8. A method for stabilizing plastics comprising the method as claimed in claim 7.

9. A method for stabilizing polyurethanes comprising the method as claimed in claim 8.

10. A thermoplastic molding composition comprising at least one stabilizer composition as claimed in claim 1.

11. A method for stabilizing thermoplastic polyurethanes comprising the method as claimed in claim 9.

* * * * *